United States Patent [19]
Weir

[11] 3,965,959
[45] June 29, 1976

[54] TIRE BUFFER

[76] Inventor: James D. Weir, 3863 Prospect No. 8, Culver City, Calif. 90230

[22] Filed: Sept. 9, 1974

[21] Appl. No.: 504,509

[52] U.S. Cl. .............................. 157/13; 51/106 R
[51] Int. Cl.² ...................... B29H 21/01; B24B 5/00
[58] Field of Search ............... 157/13; 51/99, 101 R, 51/106 R, DIG. 33; 125/11 PH

[56] References Cited
UNITED STATES PATENTS

| | | | |
|---|---|---|---|
| 2,720,130 | 10/1955 | Chang | 125/11 PH |
| 3,473,596 | 10/1969 | Meixner | 157/13 |
| 3,537,502 | 11/1970 | Napolitano | 157/13 |
| 3,724,137 | 4/1973 | Hofelt, Jr. et al. | 51/106 R |
| 3,841,033 | 10/1974 | Appleby et al. | 51/106 R |

*Primary Examiner*—Al Lawrence Smith
*Assistant Examiner*—James G. Smith

[57] ABSTRACT

A machine for buffing worn tire casings to prepare them for retreading which includes a rotary tire casing support and a pair of powered rotary rasps engageable with a tire casing on said support, the tire casing support being movable toward and away from said rasps and the rasps being located approximately rearwardly of the tire casing support control means located at the opposite radial side of a tire casing support so that the operator can stand adjacent to one part of the tire casing support and the two rotary being located opposite to the control means. There is also a hydraulic system for moving the rasps away from each other and simultaneously actuating a template follower to allow the movement of the tire casing support and the engagement with said rasps. The rasps and template arm being swingable on pivots by a Hydraulic System, allowing the tire casing support to move through the rasps in correlation with the template arm and template, the template being movable in response to movement to the tire casing support toward the rasps. The system includes means for synchronizing the two hydraulically actuated rasps.

11 Claims, 9 Drawing Figures

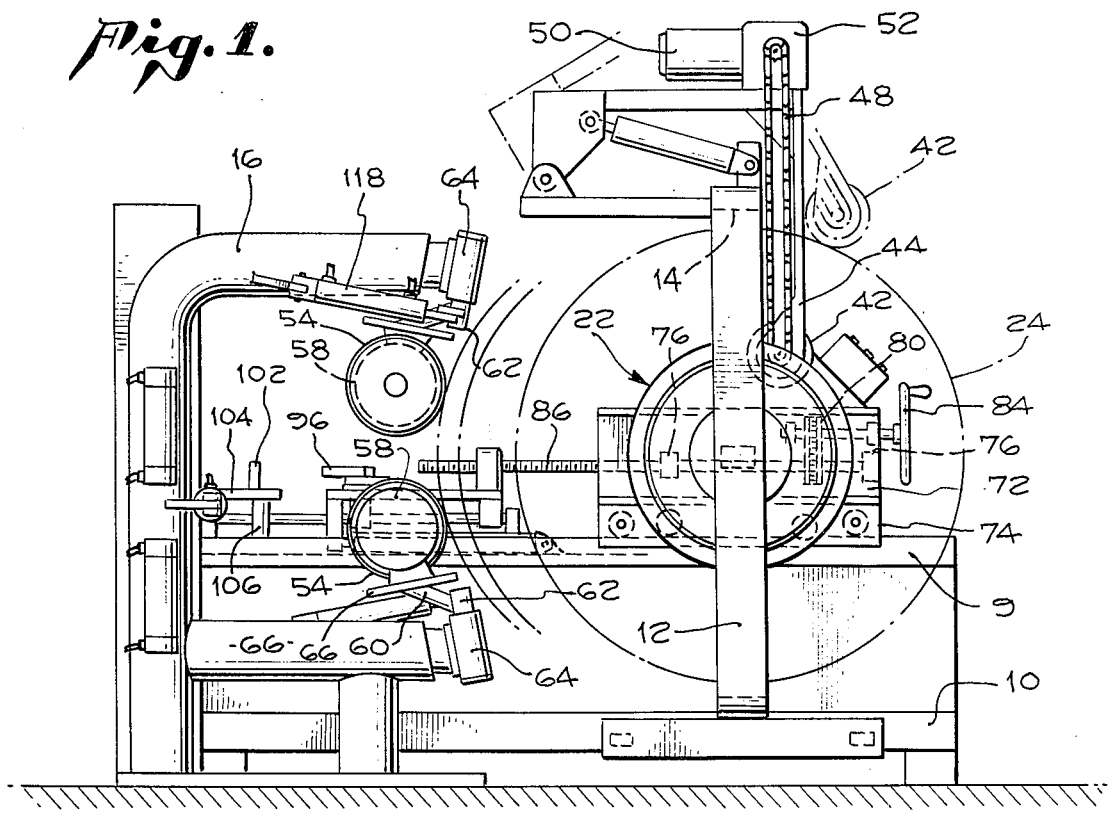
Fig. 1.
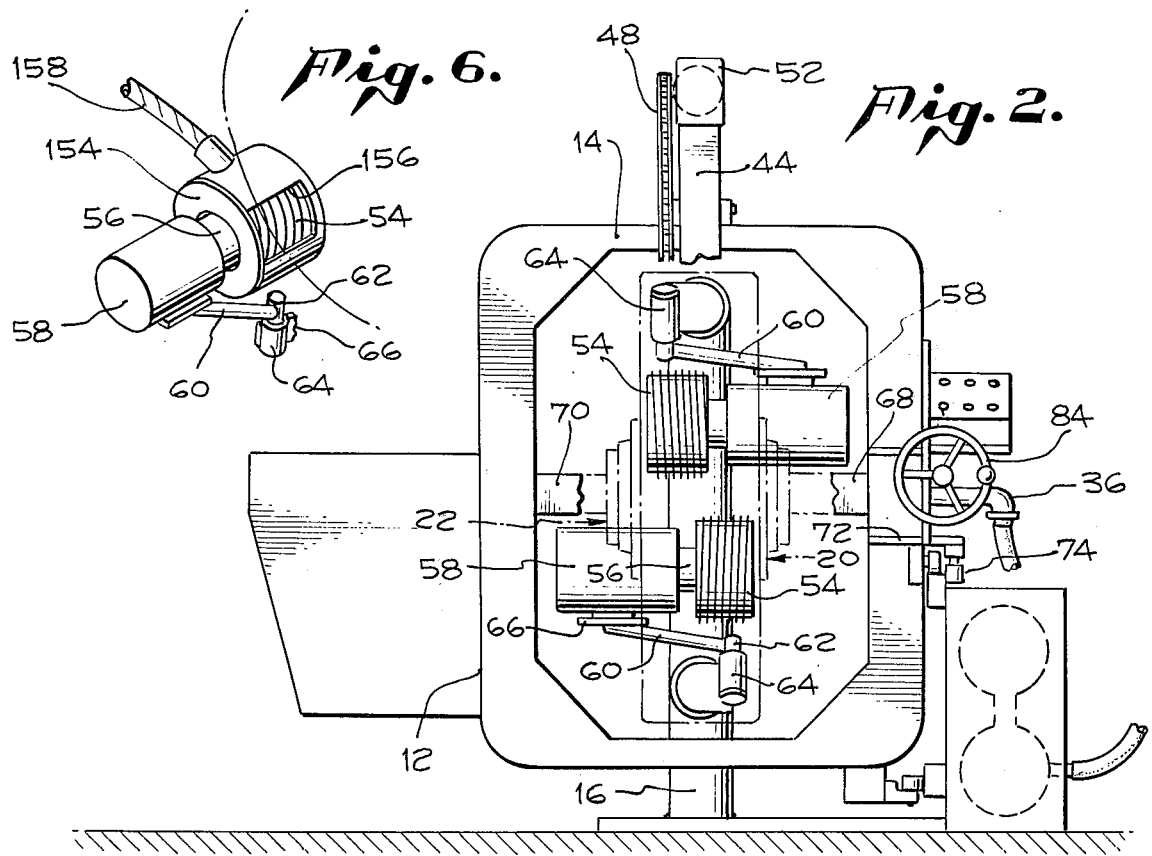
Fig. 6.
Fig. 2.

TIRE BUFFER

This invention relates to apparatus for buffing worn automobile tire casings or the like. In prior devices frequently a single rather than a double rasp unit is provided. Even in machines utilizing two rotary rasps, they are more or less diametrically opposed so that one rasp lies closely adjacent the operator of the machine as he feeds the tire casing support, or loads a fresh casing into the device. The present invention has as an object the provision of a pair of rotary rasps located at what might be termed as the rear of the tire casing support, as opposed to the front area of the tire casing support, so that the operator is in no danger whatsoever of engaging the rasps during the buffing or loading operation.

The two rotary rasps are mounted for rotation by means of an electric motor, one for each rasp and a hydraulic system for swinging the rasps in synchronization from central circumferential portions of the tire casing in opposite directions across half the casing and a desired distance of the sidewall of the casing.

Another object is to provide a pair of rasps, each with a hydraulic piston and cylinder unit coupled in a hydraulic system, together with a master or template follower piston and cylinder unit in flow communication with the rasp piston and cylinder units for moving the rasps.

Another object is to provide a pair of powered rotary rasps and a template follower, with actuating pistons for swinging them, one or all cylinders including a bypass to permit momentary shifting of one rasp relative to the other, for substantially instantaneous re-alignment of the two rasp pistons.

A further object is to mount the powered rasps on pivots which permit simultaneous swinging of each rasp in opposite directions across the main tread portion of the tire casing and down the sides thereof.

A further object is to provide a template movable with the tire casing support and engaged by a template follower or cam, that is controlled by the actuation of a master piston and cylinder unit which in turn controls the movement of the two rasp pistons.

Still another object is to provide a simple and readily adjustable mounting for the tire casings to accommodate the tire casing support to various sizes.

The above and other objects of the invention will more fully appear in the following description and the accompanying drawings:

In the drawings FIG. 1 is a side elevational view of the device;

FIG. 2 is a rear elevational view;

FIG. 6 is a perspective view showing one of the buffers or rasps mounted on a motor which in turn is carried by a rasp arm;

Figure 3:
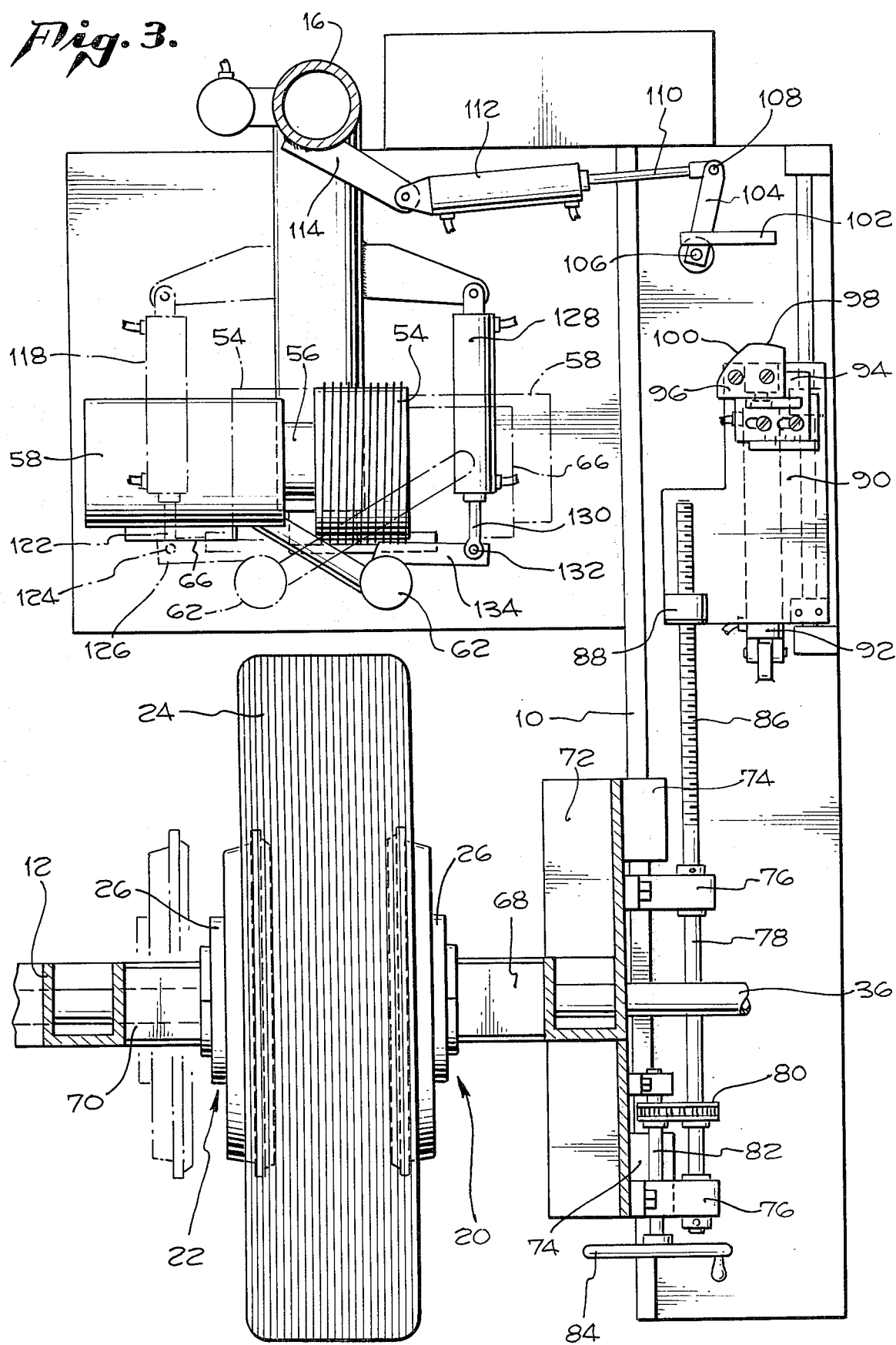
FIG. 3 is a front elevational view on somewhat a larger scale.
Figure 4:
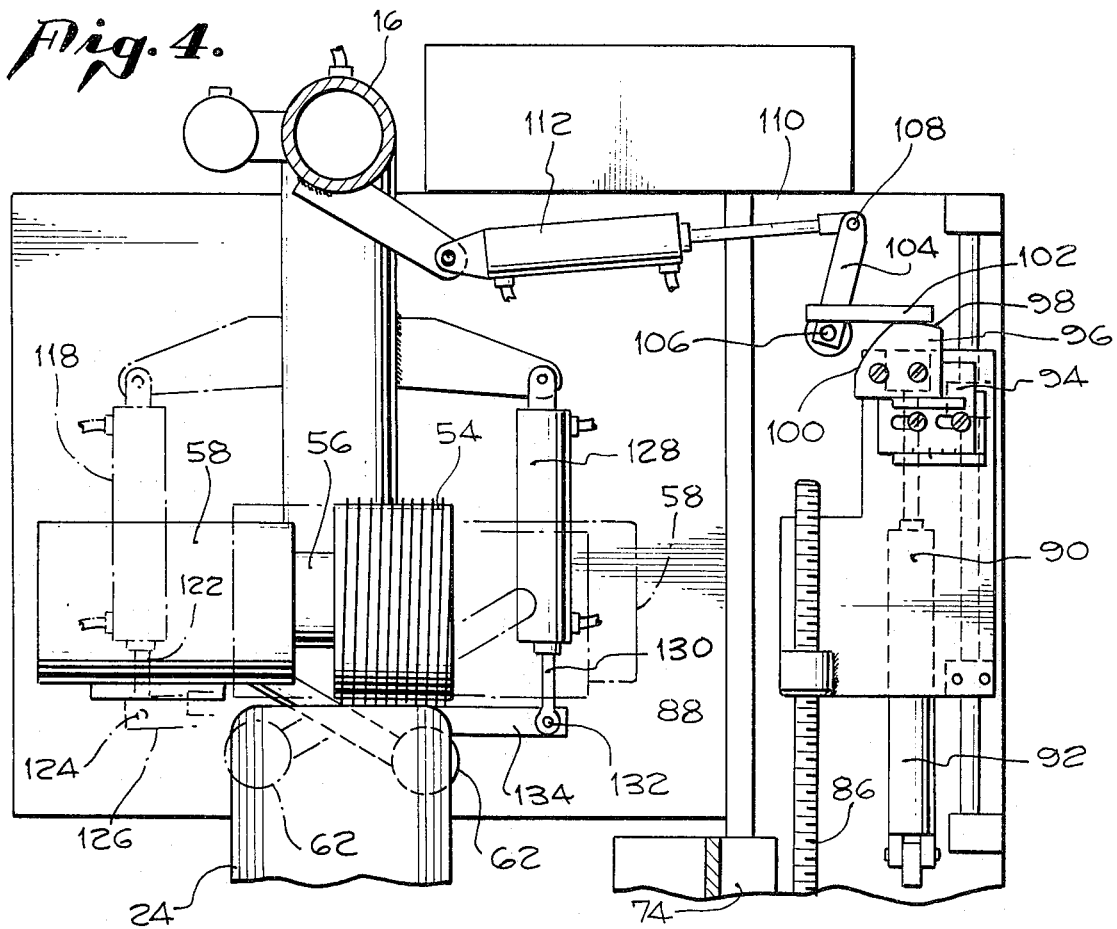
FIG. 4 is a top plan view showing the template follower or cam at the beginning of the rasp movement across the tire casing.
Figure 5:
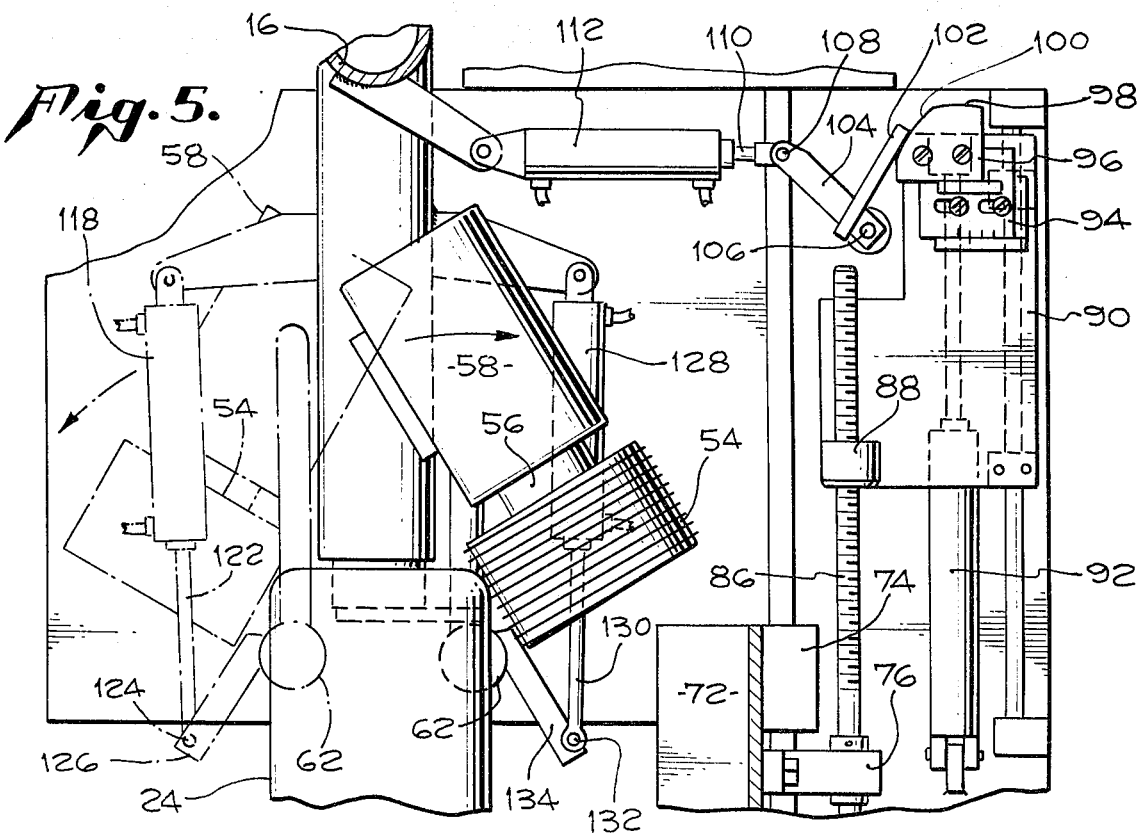
FIG. 5 is a similar view to FIG. 4, but with the template and its follower moved to move the rasps to positions at angles relative to their starting positions in FIG. 4.

The machine includes a frame having a pair of rails 9 and 10. A tire casing support includes vertical uprights 12, the latter being connected by a cross frame 14. The rear of the frame is provided with a vertical upright 16, which is connected to the right forward ends of rails 9 and 10.

As illustrated in FIGS. 1, 2, 8 and 9 there is shown a pair of rotatable tire casing supports 20 and 22 between which is clamped a tire casing 24. The tire casing support is shown as including a hub 26 upon which is mounted a removable tire bead sealing ring 28. The rings can be of different outside diameters and can be quickly removed and replaced by loosening one or more lugs 30 which can be swung aside so that bead engaging ring 28 can be removed.

The wheel support members which are identical on each side of the tire are provided with "O" ring seals 32 so that a tire casing with the bead thereof lying against the slanted circumferential face 34 with the properly sized bead flange 28 can be mounted on opposed bead flanges. The tire casing can then be inflated by means of air from a suitable source which is fed into the tire casing holder through a pipe 36.

A tire is rotated by a friction drive wheel 42 mounted on an arm 44 which extends downwardly from a pivoted support arm 46. A drive chain 48 is connected between a motor driven gear box 52 and the drive wheel 42, a motor 50 being drivingly connected to the gear box.

At the left or rear end of the machine is a pair of rotary rasps 54. Each rasp is mounted on a shaft 56 of an electrical motor 58. Each of the motors is supported by an arm 60 which is pivotally connected at 62 to a post 64 mounted on a suitable support 66. It will be noted that the axis of the pivotal connection 62 in each case is approximately tangent to the surface of a tire 24 and the rasps 54 are so positioned in FIGS. 1 and 2 that they lie against the tread surface of the tire casing and as indicated in FIG. 2 said rasps slightly overlap.

The tire casing supports 20 and 22 are carried by axles 68 and 70. Axle 68 is supported by a carriage 12, 14 having roller members 74 mounted upon substructure 72.

The carriage 72 has a bearing block 76 on which is rotatably mounted a shaft 78. This shaft at one end is connected by a chain 80 to a stub shaft 82, the latter being rotatable by a hand wheel 84. Shaft 78 has a threaded portion 86 which is threaded through a nut 88 on a template table 90. A piston and cylinder unit 92 has a piston thereof connected to template table 90. Template plate 94 is movable laterally relative to template table 90. On the template table 90 is a template 96 having a slightly curved leading edge portion 98 and a rearwardly and laterally directed portion 100.

The screw shaft 78 is adjustable to adjust the template table 90 and template 96 for tire casings of different diameters. The air cylinder 92 is operable to move the template table 90 forwardly and rearwardly relative to the follower arm 102.

The follower arm 102 is in the path of movement of the template 96 and has an angular offset 104 supported on a pivot 106. The opposite end of the offset 104 is pivotally connected at 108 to a piston rod 110 movable in an air cylinder 112 supported by a bracket 114 on the frame upright 16.

Figure 7:
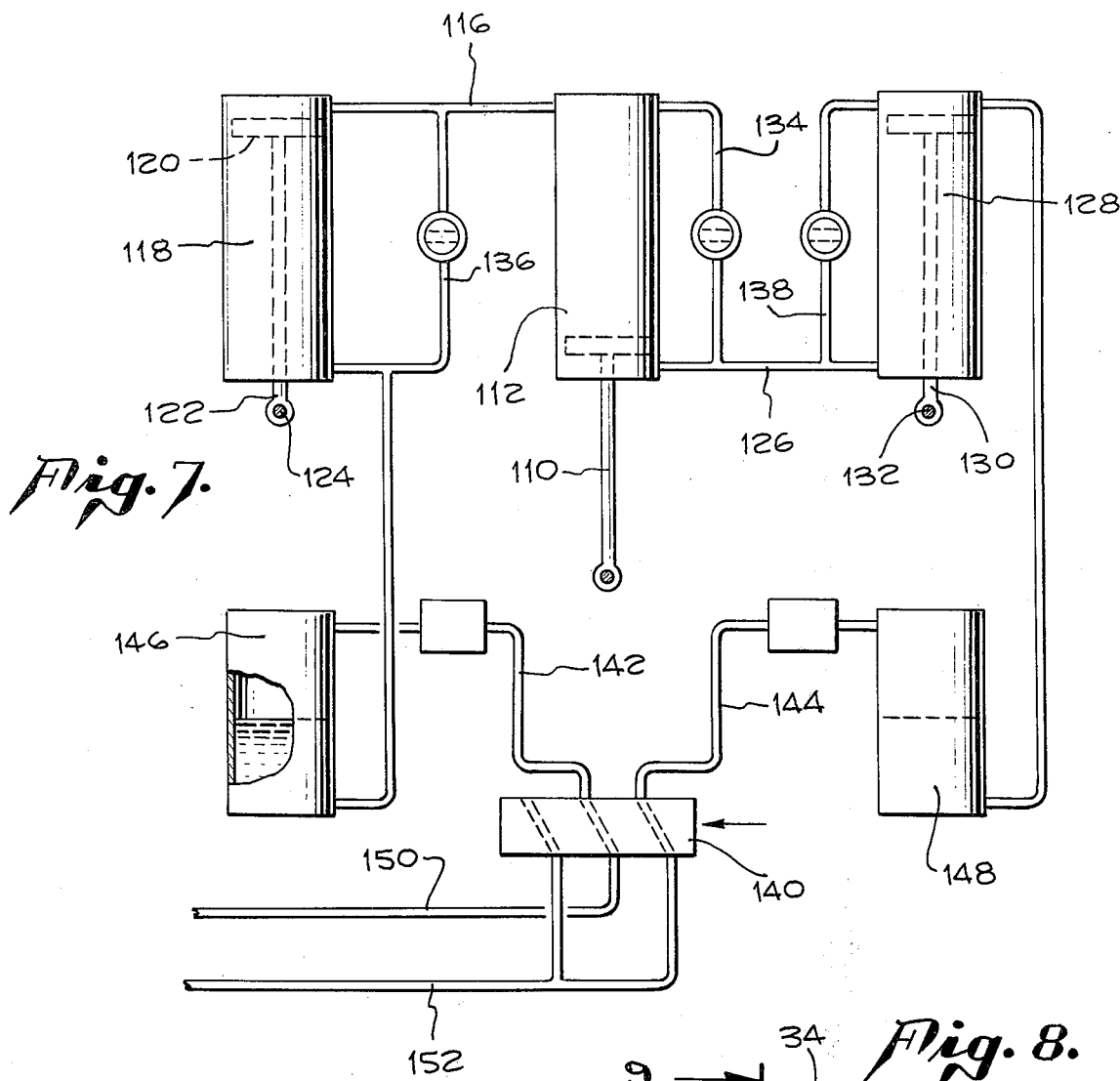
FIG. 7 is a diagrammatic showing of the hydraulic system, including the master piston and cylinder and the slave pistons in the rasp piston and cylinder elements.
Figure 9:
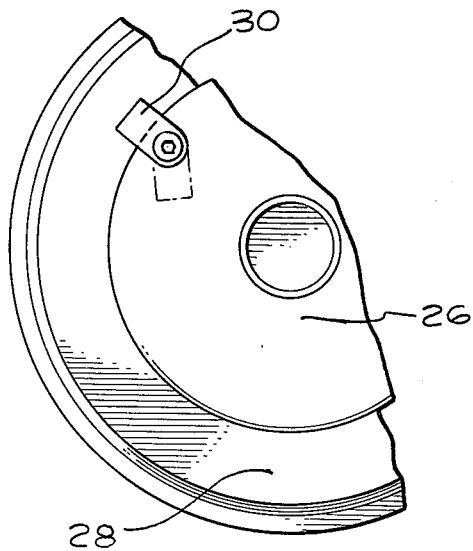
FIG. 9 is a partial elevational view of the structure of FIG. 8.
Figure 8:
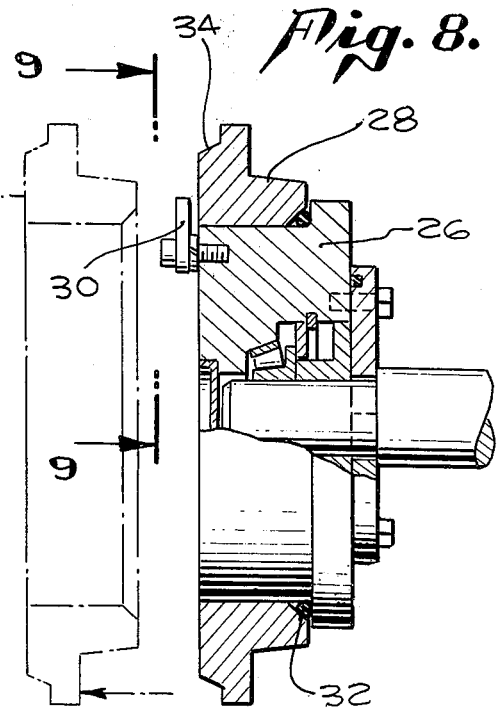
FIG. 8 is an enlarged vertical sectional view illustrating the hub and casing retainer of the rotary tire casing support.

The air cylinder 112, as shown in FIG. 7 is connected by a conduit 116 to one end of an air cylinder 118 having a piston 120 therein. Its piston rod 122 is connected at 124 to a bracket 126 which in turn is connected to one of the pivotal supports 60 of one of the rotary rasps 54.

The air cylinder 112 is also connected by a conduit 126 to one end of a cylinder 128 for a piston rod 130 connected at 132 to a bracket arm 134 which in turn is connected to the other of said rotary rasp motor mountings 60. In FIG. 2 there is shown a control box 160 on which is diagramatically indicated a group of switch buttons 162. These switch buttons are in conventional electrical circuits (not shown) for actuating the rasp motors 58, the tire rotation drive motor 50, and suitable electrically actuated solenoid valve means for controlling the fluid circuitry, one such valve being diagrammatically indicated at 140.

The air cylinders 112, 118 and 128 are provided with valved bypass lines 134, 136, and 138 respectively. These bypass lines are provided to permit proper synchronization of the positions and movements of the pistons of several cylinders and more particularly synchronization of the rasp actuating piston rods 122 and 130. This feature eliminates what heretofor has been a time consuming and laborious re-alignment procedure.

A valve 140 is connected by lines 142 and 144 through reservoirs 146 and 148 to the rasp actuating cylinders 118 and 128 respectively. Running to the valve 140 is a high pressure line 150 and a low pressure line 152. In FIG. 7 the valve is set to permit high pressure flow through the line 142 to one side of the piston in cylinder 118. The valve 140 can be shifted so that the high pressure from line 150 can be directed through line 144 to the cylinder 128. In the latter case the low pressure side of cylinder 118 will be connected through line 142 to the low pressure line 152. This overcomes the accumulation of air in the system and prevents "sponginess" in operation.

In FIG. 6 there is illustrated one of the rotary rasps 54 with its motor 58. The rasp 54 is located in a housing 154 having a window 156 to permit the rasp to contact the tire casing. Connected to the housing 154 is a suction line 158 which is adapted to carry off rubber particles removed from the tire casing by the rasp 54. In this manner, objectionable rubber particles are not permitted to escape into the atmosphere in which the machine is located.

It will be seen that I have provided a machine for buffing tire casings preparatory to recapping wherein there is provided a pair of rotary rasps acting identically on the medial and side portions of a tire casing to ensure symetrical buffing of the casing. The rasps are located adjacent each other at the rearward portion of the machine on the opposite side of the casing from the operator's station. Consequently, there is no danger of injury to the operator by the rasps.

Movement of the rasps about their pivots is accomplished by an air powered hydraulic system which simultaneously operates pistons in slave cylinders on the pivotal supports of the two rasps.

The device is adapted to support casings of different diameters and the supporting means is readily convertible to accommodate different casing head diameters.

The rasps are mounted on pivotal supports which, in the starting position thereof lie on axes which are tangent to the casing to be buffed, or essentially so.

The rotary rasps are provided with means for collecting and drawing off the dust-like particles of rubber removed from the casing in the buffing operation.

It should be understood that various changes can be made in the form, details, arrangement and preparations of the various parts without departing from the spirit of the invention.

I claim:

1. A tire buffer for pneumatic tire casing to be retreaded which includes
   a rotary tire support,
   a pair of powered rotary rasps in one hemisphere of said support and at each side of a plane containing the rotational axis of said rotary support, the rotational axes of said rasps being parallel in their initial positions to the rotational axis of the support, supporting means for each rasp, and means for moving said rasps into engagement with the tread of a tire casing on said support from initial position in engagement with the central peripheral portion of the tire to successive positions from the central peripheral portion in a direction transversely of the tread portion in opposite directions on a cross-sectional profile of the tire to the sidewall portions thereof.

2. The structure in claim 1, and said rasp moving means including common fluid power means connected to both said movable rasp supporting means, said power means and said rasp supporting means being arranged to move in identical opposite paths to provide transversely symmetrical rasping of the two sides of the tire casing.

3. The structure in claim 2, and said power means comprising a hydraulic system, and said rasps being connected in a series in said system.

4. The structure in claim 1, and the supporting means for each rasp including a pivot on an axis, an extension of which comprises of approximately a tangent to the working surface of its respective rotary rasp.

5. The structure in claim 1, and said rasp supporting means including a bracket having pairs of pivot arms, one arm of each pair being anchored, the other arm having thereon a motor with a motor shaft, one each of said rasps being mounted upon a respective motor shaft for rotation therewith, each of said other arm, the motor and the rasp being swingable as a unit relative to said rotary tire casing support.

6. The structure in claim 1, and said rotary tire casing support having a front portion and a radially extending rear portion, rasp actuating control means adjacent the front portion of the rotary tire casing support, and said rotary rasps being located adjacent the rear portion of the tire casing support.

7. A tire buffer for pneumatic tire casting to be retreaded which includes a rotary tire support a pair of overlapping powered rotary rasps, in the same hemisphere of said support supports upon which the rasps are movable about complementary portions of the cross-sectional profile of the tire a hydraulic system, a cylinder and piston unit in the hydraulic system for each rasp and connected therewith to move the rasps relative to the tire casings, a common control piston and cylinder unit in the hydraulic system for the rasps and in flow communication with the respective rasp piston and cylinder units, and the two rasp piston and cylinder units being movable synchronously in response to movement of the control piston.

8. The structure in claim 7, and said tire casing support and said rotary rasps all being movable about substantially parallel axes in the initial positions of the rasps.

9. A machine for buffing a tire which is to be retreaded, comprising:
   means for supporting and rotatably driving the tire;
   a pair of powered rotary rasps, one mounted on each side of a plane defined by the radii plane of the tire for movement away from and toward said plane and about complementary portions of the cross-sectional profile of the tire, both of said rasps being also mounted within a single quadrant of the tire; and
   means for synchronizing the movement of said rasps concurrently towards or away from a given position relative to said plane.

10. A tire buffer for pneumatic tire casings to be retreaded which includes a rotary tire support, a pair of powered rotary rasps, supports upon which the rasps are movable relative to a tire casing on its support, a hydraulic system, a cylinder and piston unit in the hydraulic system for each rasp and connected therewith to move the rasps relative to the tire casings, a control piston and cylinder unit in the hydraulic system and in flow communication with the respective rasp piston and cylinder units, the two rasp piston and cylinder units being movable synchronously in response to movement of the control pistron, said rasps being swingable toward and away from each other, and said tire casing support being movable into engagement with and also between the rotary rasps as they swing away from each other.

11. The structure in claim 10, and a normally closed bypass in said hydraulic system around at least one rasp piston and cylinder unit for the rotary rasps to permit synchronization of the bypassed piston and cylinder unit with the piston for the other rotary rasp.

* * * * *